United States Patent [19]
Anderson et al.

[11] Patent Number: 6,097,431
[45] Date of Patent: *Aug. 1, 2000

[54] METHOD AND SYSTEM FOR REVIEWING AND NAVIGATING AMONG IMAGES ON AN IMAGE CAPTURE UNIT

[75] Inventors: Eric C. Anderson, San Jose, Calif.; Hugh Blake Svendsen, Apex, N.C.

[73] Assignee: FlashPoint Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,370

[22] Filed: Sep. 4, 1996

[51] Int. Cl.[7] .............................. H04N 5/76; H04N 7/00; H04N 11/00
[52] U.S. Cl. ........................ 348/233; 348/552; 345/353
[58] Field of Search ..................................... 348/333, 334, 348/552, 233, 231; 345/338, 351, 353

[56] References Cited

U.S. PATENT DOCUMENTS

| | | | |
|---|---|---|---|
| 5,021,989 | 6/1991 | Fujisawa et al. | 364/900 |
| 5,742,339 | 4/1998 | Wakui | 348/233 |
| 5,781,175 | 7/1998 | Hara | 345/127 |
| 5,796,428 | 8/1998 | Matsumoto et al. | 348/231 |
| 5,977,976 | 11/1999 | Maeda | 345/353 |

*Primary Examiner*—Wendy Garber
*Assistant Examiner*—Alicia Harrington
*Attorney, Agent, or Firm*—Sawyer Law Group LLP

[57] ABSTRACT

A method and system for reviewing and navigating through images displayed on an image capture unit is provided. A method and system includes displaying images in a predetermined number of group types. Each of the group types indicates a number of images to be displayed at a time. The number of images displayed at a time being a page of images. The method includes selecting one group type from the predetermined number of group types and navigating through a plurality of images within the group type through the use of a highlighting area surrounding an image to be selected. Finally, the method and system includes selecting a particular image within the group type based upon the highlighted area. In one aspect, the method and system includes a four-way button to facilitate ease of movement between an image or cell and between pages of images. It also includes a mode button which allows for movement between group types and a view button to facilitate selection of a particular image. In addition, a method and system in accordance with the present invention allows for more natural movement for selection through the use of the four-way button in conjunction with the other buttons. Accordingly, navigation through images can be accomplished in a more expeditious fashion.

14 Claims, 21 Drawing Sheets

METHOD AND SYSTEM FOR REVIEWING AND NAVIGATING AMONG IMAGES ON AN IMAGE CAPTURE UNIT

FIELD OF THE INVENTION

The present invention relates generally to a image capture unit and more particularly to a method and system for reviewing and navigating among images in such a unit.

BACKGROUND OF THE INVENTION

Digital cameras are utilized for taking pictures of scenes and the like. Some digital cameras include a display screen to display images after the picture has been taken. Digital cameras which include a display screen oftentimes have the ability to display group types of images at the same time. For example, a digital camera may display a group type of one image, a group type of four images, a group type of nine images at the same time. Each of the group types includes a plurality of pages where a page is the number of images on a display at one time (in this case 1, 4 or 9 images). In such a camera there is also the ability to navigate from one image or cell to another or from one page of images of the group type to another page of images of the group type. When we refer to one page of images, what is meant by that is one page of four to the next page of four, one page of nine to the next page of nine, and so on and so forth. There is oftentimes the ability in such digital cameras to move between group types via a mode button. What is meant by this, for example, is that it is possible through such a mode button to move between one single image to a group type of four images to a group type of nine images. Oftentimes in these types of digital cameras, the reviewing and navigating within a plurality of images via a particular group type (i.e. 1, 4 and 9) and also between the pages of images via the mode button are complex and unnatural. In addition, in some situations, a large number of keystrokes are necessary to view a selected image.

To more particularly describe some of the problems with previous displays in digital cameras, such as the display in a Casio QV10 camera, refer now to the following discussion in conjunction with FIG. 1. FIG. 1 shows a conventional digital camera display which includes a zoom button 3, a display button 5, a mode button 7, and a forward-reverse button 9. In such a camera the display button 5 allows one to switch between page and image mode to look at a particular image (Image A). The zoom button 3 allows one to proceed from a small image to a full size of a selected image, the mode button allows one to select different group types and the forward-reverse button 9 allows one to go from one image to an earlier image or a later image or earlier or later page.

FIG. 2 shows, the interaction between the different buttons to allow for the display of images in different formats. Initially, if in the group type one mode or one image per display, the forward and reverse button would allow one to go forward one image or back one image (block 11). If the mode button is pressed one time, then, for example, four images, A, B, C and D are each displayed (block 13). The forward and reverse buttons now provide for one page of four forward, one page of four back. If the mode button is pressed again, nine images are displayed (block 15) (A, B, C, D, E, F, G, H, I). The forward and reverse buttons now provide for one page of nine forward, one page of nine back. To go back to the first mode, the zoom button would be pressed to go back to image A as shown in block 23 only if the display button is pressed first. Otherwise the mode button is pressed. If the display of a particular image is desired, the display button would be pressed. Initially, an indication of a selected image is provided via underlining shown in blocks 13 and 17 (in this case A). The forward-reverse buttons are used to proceed to the next image within the group type highlighted by the underline. If, for example, you wanted to display a selected image from the nine mode, then the zoom button would be pressed and the single image would be displayed.

However, as is seen, there is a complex interaction of zoom, display mode and forward-reverse to provide the appropriate images. This approach is not natural and requires many keystrokes in certain applications.

To more clearly illustrate this, referring now to FIG. 3A, what is shown is the selection of a fourteenth image from an image capture unit using the elements as described above. First, if the mode button would be pressed twice, as shown, to proceed to the mode where there are nine images being displayed at one time. Then the forward button is pressed to proceed to the next page. Then the display must be pressed. Then the forward button is then pressed four times to select the fourteenth image. Finally, the zoom button is pressed so that the desired image is now displayed. As is seen, this process requires nine keystrokes.

FIG. 3B shows the selection of the twenty-sixth image of the display proceeding from the fourteenth image. To select the twenty-sixth image, first the mode button must be pressed to return to the four mode. As is seen, image (N) 14 is now in a first position in top row rather than its original middle position of the second row. The mode button is then pressed again. Next, the plus button is pressed to proceed to the page that has the twenty-sixth (Z) image. The display button is pressed to underline the first image of the page (image twenty-three). The plus button is then pressed three additional times to select the twenty-sixth image. Thereafter, the zoom button is pressed to display the image. As is seen, eight additional keystrokes are required to proceed to display the twenty-sixth image. This can become time consuming and tedious for a user of the image capture device. In addition the process for obtaining a particular image is not a natural one and requires learning a particular protocol.

Accordingly, the conventional systems not only require more keystrokes, they are also less natural because different buttons have different functions dependent upon where a user is within the process.

There is a need, therefore to be able to provide images on a display device which will allow for the user to review various images that have been taken, while at the same time provide a display and readout of a particular image in an expeditious and straightforward manner. For example, after taking several pictures it would be useful to identify a particular picture quickly, with the minimum of effort and at the same time be able to refer to another picture in the same manner. It is also important to provide for more efficient ways to quickly navigate through a series of images. The system should be implementable in a simple and cost effective fashion and should be easily handled by a user.

The present invention addresses such a need.

SUMMARY OF THE INVENTION

A method and system for reviewing and navigating through images displayed on an image capture unit is disclosed. A method and system comprises images in an image capture unit comprising displaying images in a predetermined number of group types. Each of the group types indicates a number of images to be displayed at a time. The number of images displayed at a time comprising a page of images. The method includes selecting one group type from the predetermined number of group types and navigating through a plurality of images within the group type through the use of a highlighting area surrounding an image to be selected. Finally, the method and system includes selecting a particular image within the group type based upon the highlighted area.

In one aspect, the method and system includes a four-way button to facilitate ease of movement between an image or cell and between pages of images. It also includes a mode button which allows for movement between group types and a view button to facilitate viewing of a particular image. In addition, a method and system in accordance with the present invention allows for more natural movement for selection through the use of the four-way button in conjunction with the other buttons. Accordingly, navigation through images can be accomplished in a more expeditious fashion.

DESCRIPTION OF THE INVENTION

The present invention relates to a method and system for reviewing and navigating through images on an image capture unit. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention will be described in the context of digital camera. However, one of ordinary skill in the art should recognize the present invention has wide application in other environments. That is, any product which displays images; icons or other items, could incorporate the features described hereinbelow and that product would be within the spirit and scope of the present invention. The description as it relates to the digital cameras is illustrative in nature only is provided to allow one of ordinary skill in the art to fully understand the advantages of the present invention. Accordingly, the present invention is not limited to the specific embodiments shown and should be accorded the broadest scope consistent with the principles describe herein.

Figure 4:
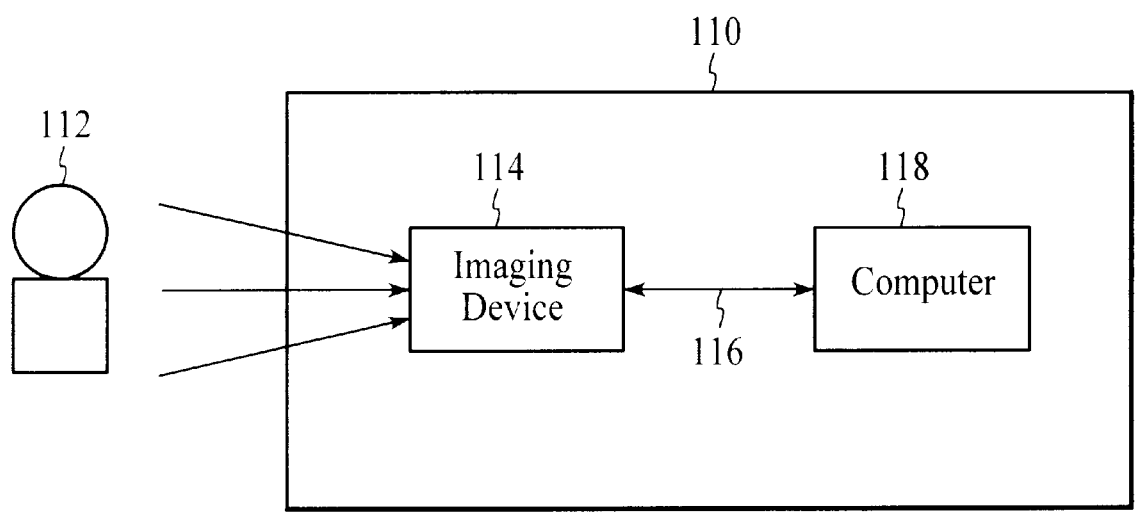
FIG. 4 is a block diagram of a preferred embodiment of the system of the present invention for reviewing and editing images on a digital camera.

Referring now to FIG. 4, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 5:
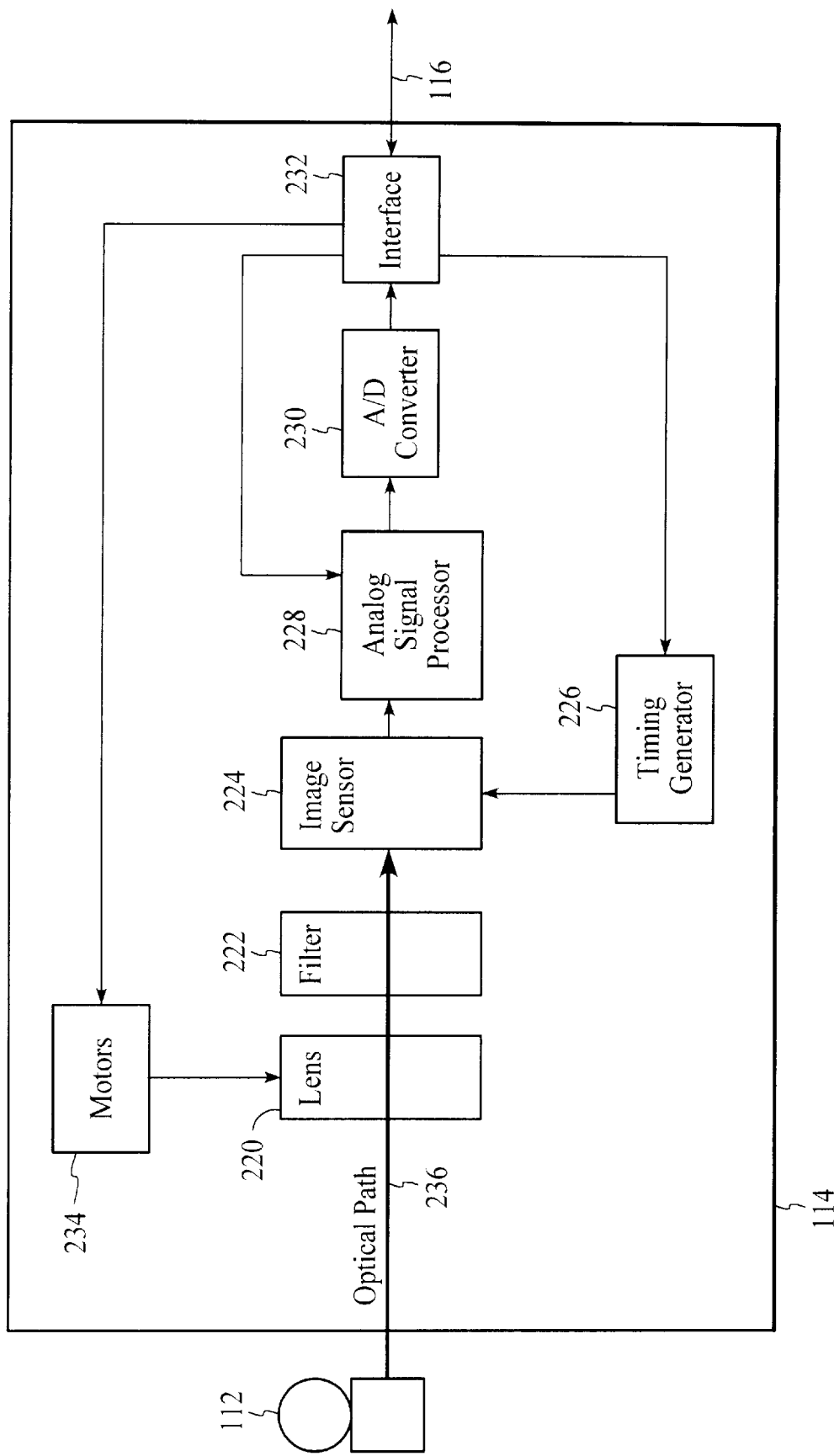
FIG. 5 is a block diagram of a preferred embodiment of the digital camera of the present invention.

Referring now to FIG. 5, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994, is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 6:
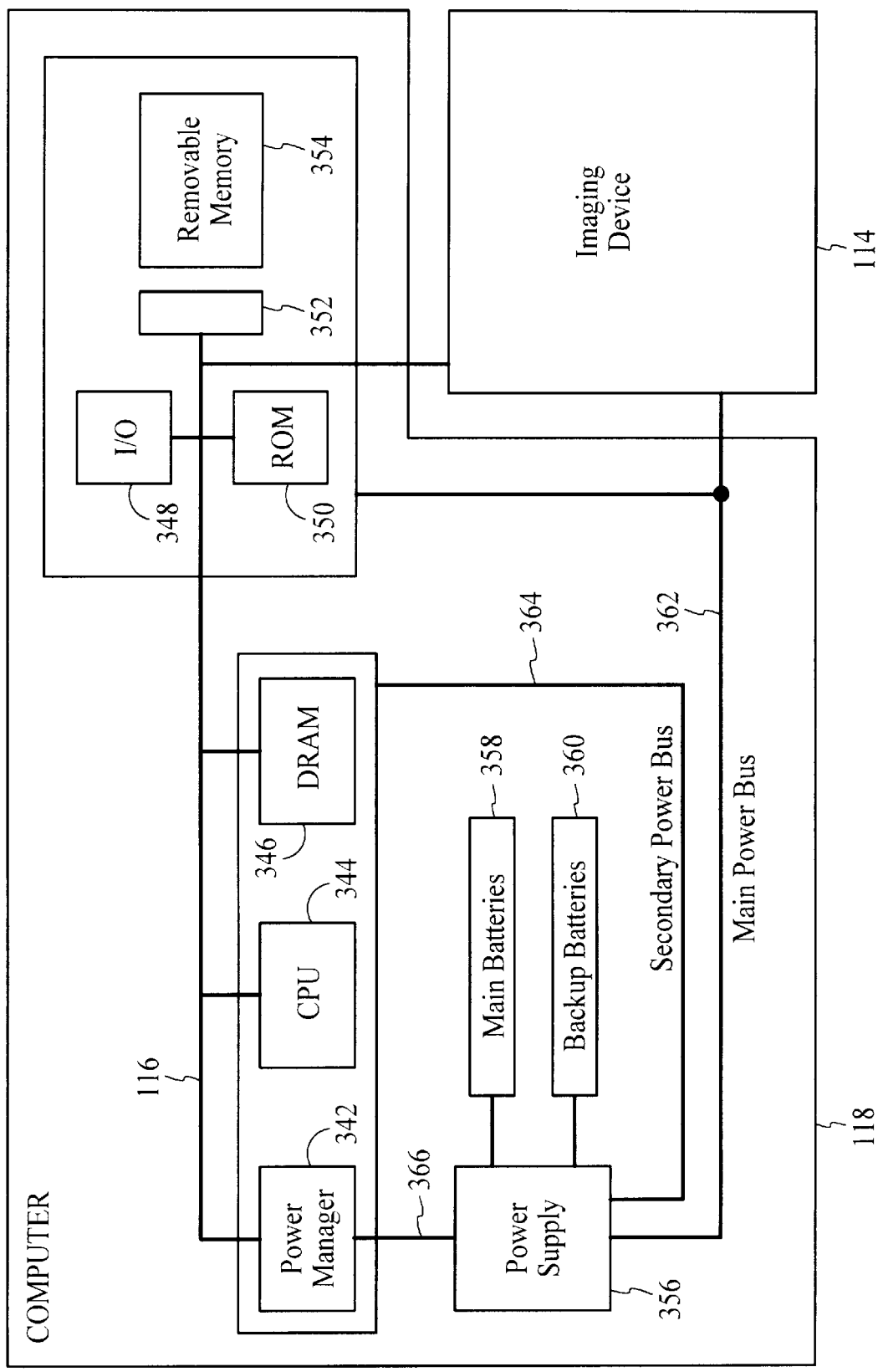
FIG. 6 is a block diagram of a preferred embodiment of a computer of the present invention.

Referring now to FIG. 6, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. Power manager 342 always receives power when both main or back up batteries are installed as external power is applied.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110 and to the power manager 364. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 7:
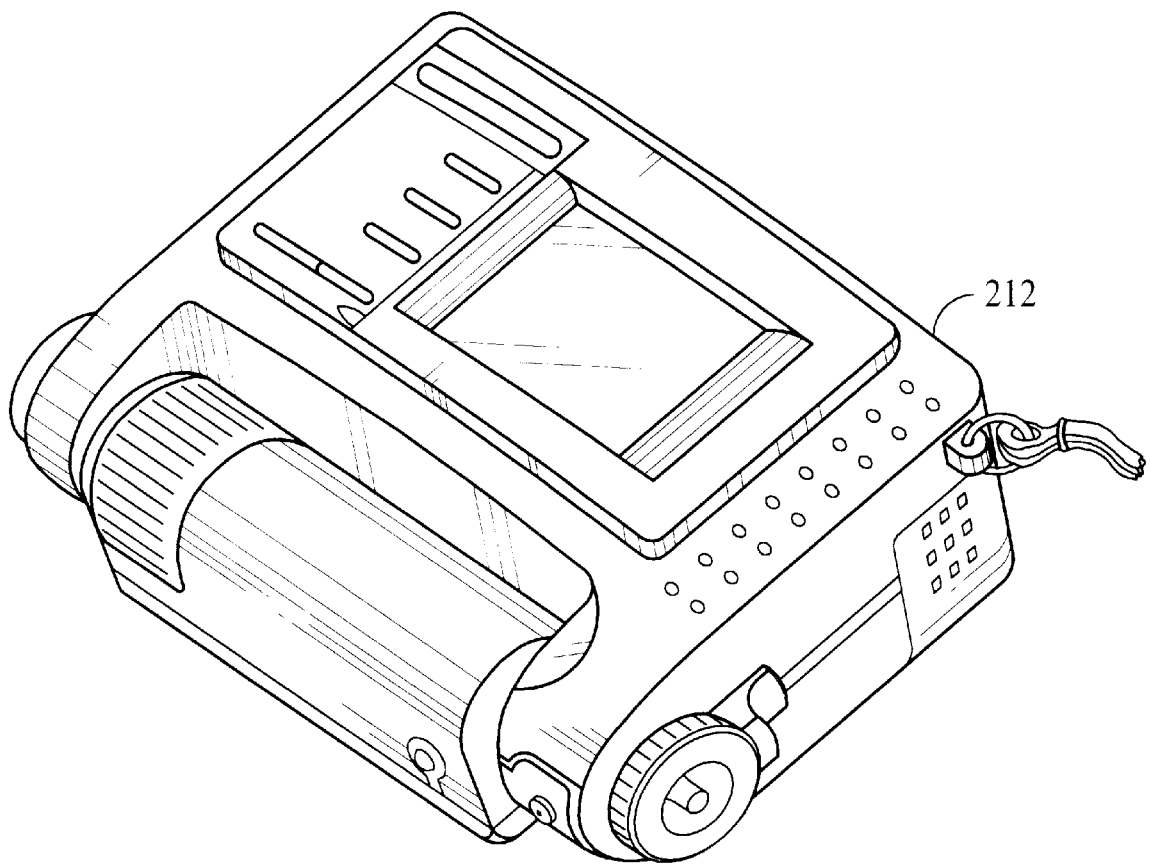
FIG. 7 is a perspective view of a digital camera.
Figure 8:
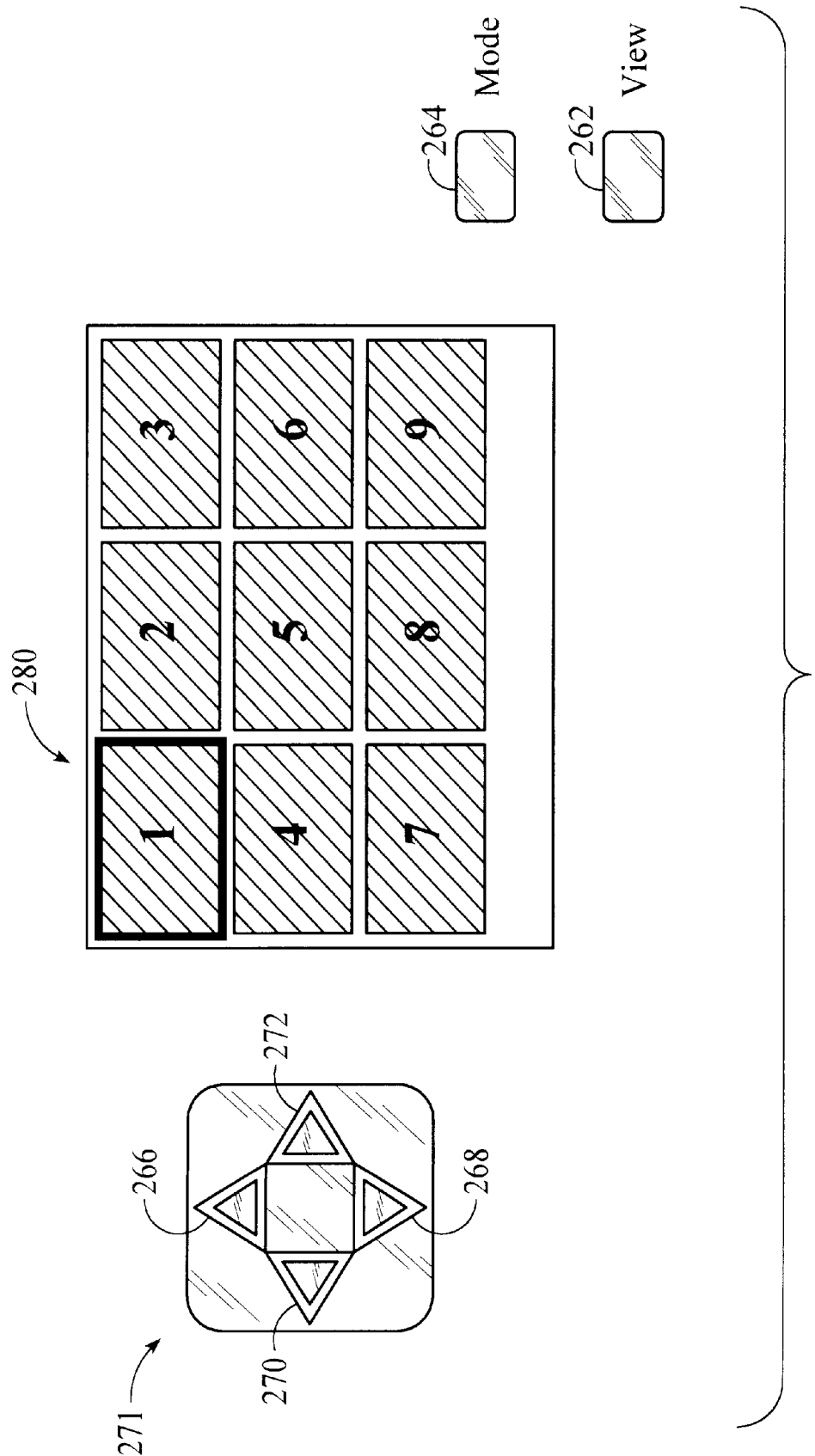
FIG. 8 is a front view of a digital camera.

Typically, a display can be utilized to allow the user to review the images captured. To more specifically describe such an image, refer now to FIGS. 7 and 8, which are perspective view and front view, respectively, of a digital camera 200. As is seen in these views, the display 212 includes a view button 262 and a mode button 264. The mode button 264 provides for displaying a plurality of images on the display. In a preferred embodiment the mode button 264 would allow for one or an array of images to be displayed at one time. In addition, there is a four way navigation control 271 which includes an up button 266, down button 268, left button 270, and right button 272 which functions will be described in detail hereinafter.

Initially one image is displayed on a display screen 280, by pressing the mode button 264 a first time four images are displayed on the display 280 and by pressing the mode button 264 again, nine images would be displayed. It should be understood, however, that the number of images per page and the number of group types could be any number and their use would be within the spirit and scope of the present invention.

Figure 9:
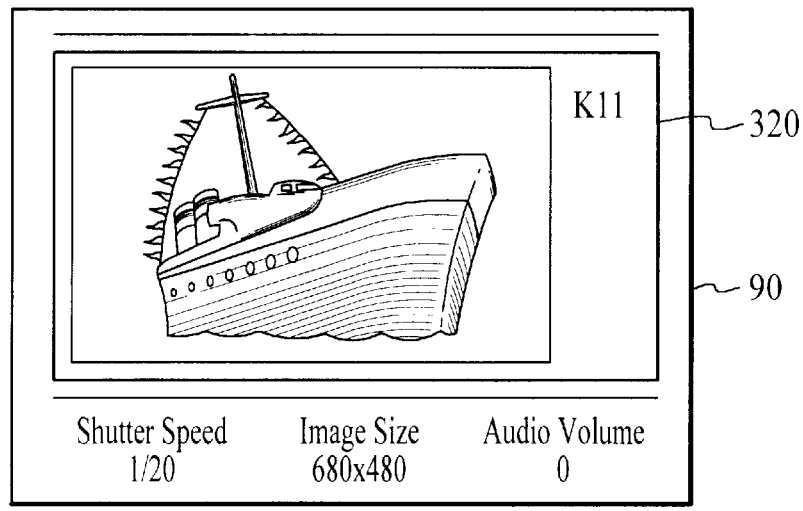
FIGS. 9 through 11 are displays of group types 90, 90' and 90" that provide one, four and nine images displayed on the screen in accordance with the present invention.
Figure 10:
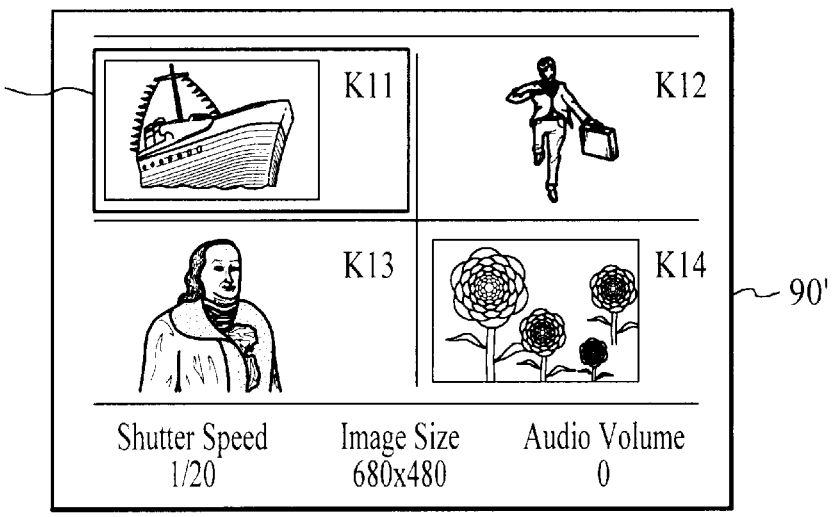
Figure 11:
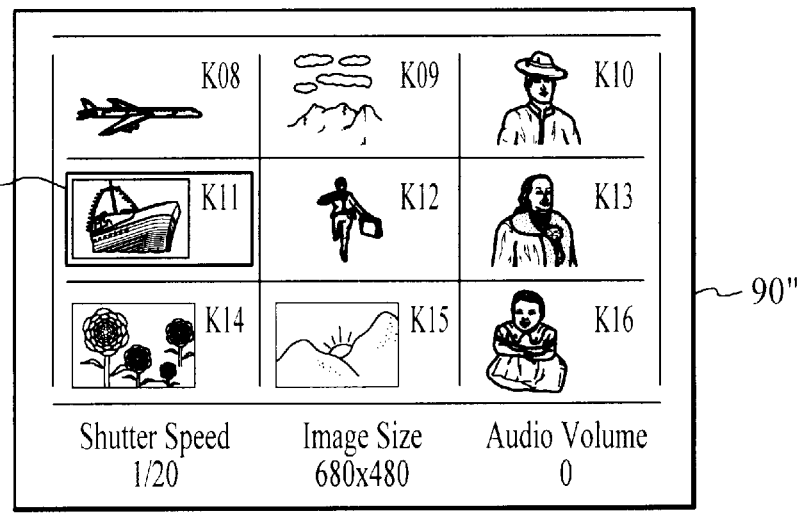

Referring now to FIGS. 9 through 11, what is shown are group types 90, 90' and 90" that provide one, four and nine images displayed on the screen. On each of these group type 90 there is a highlighted area which encircles a particular image or "cell" indicated by 320, 320' and 320", respectively, which indicates a particular image that cat be viewed in more detail. This highlighted area in this embodiment is a rectangular which allows for quick and easy identification of the image selected. One of ordinary skill in the art recognizes that selection highlighting could be oval, circular or a plurality of other shapes and its use would be within the spirit and scope of the present invention. This highlighting is controlled by the up, down, right and left buttons 266–272 (FIG. 5) to select the proper image.

Figure 12:
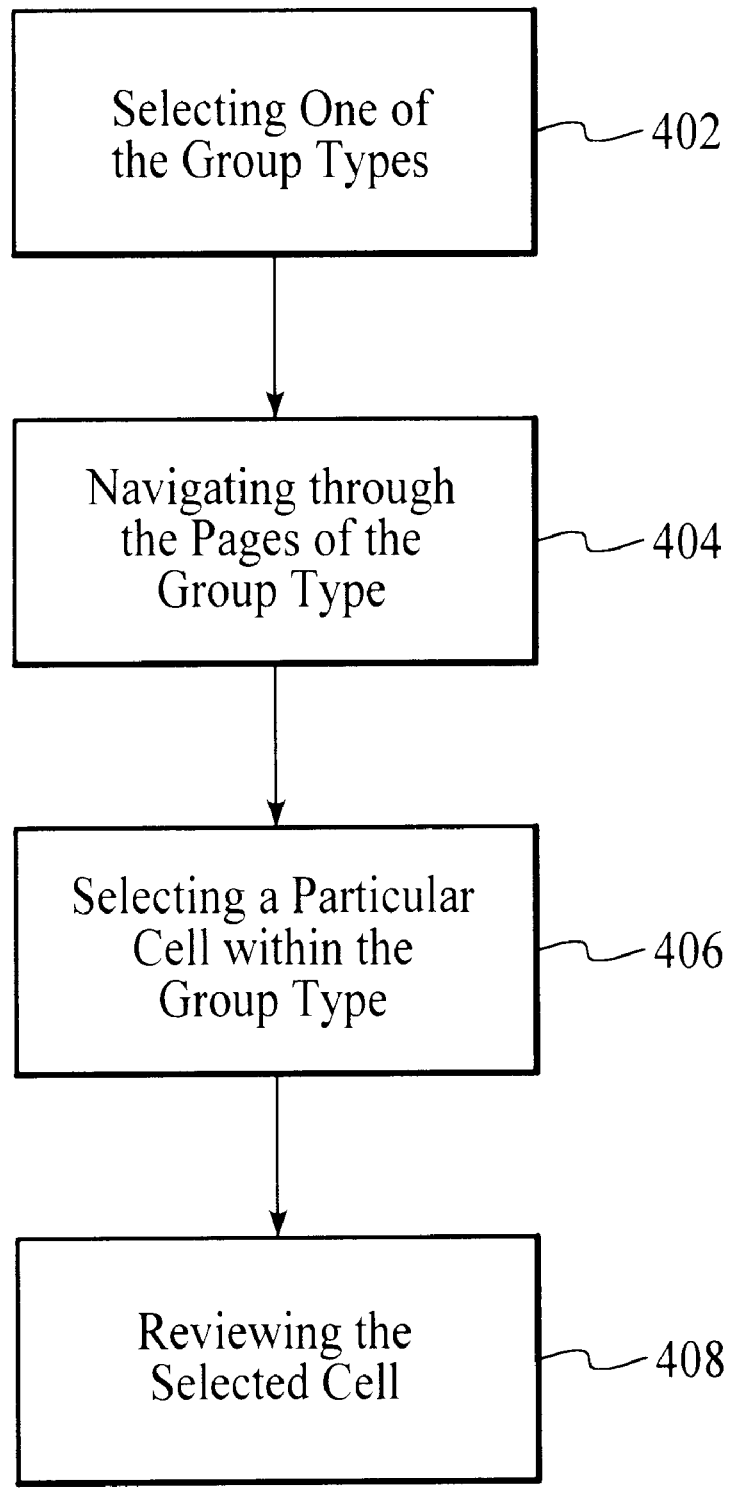
FIG. 12 is a flow chart of the operation for displaying and editing process in accordance with the present invention.

To more specifically understand the operation of this feature of the present invention, refer now to FIG. 12 which is a flow chart of the operation of reviewing and navigating process in accordance with the present invention. As is seen, a first group type is selected, via step 402. Typically, upon initialization the "group type" will be one image on the display. The group type can then be changed via the mode button. Next, it is possible to navigate between the pages within the group type via the up, down, right and left buttons, via step 404. Thereafter a cell or particular cell or image is selected via the up, down, right or left button within the page via step 406. Finally, the image can be reviewed, step 408, and can be edited, to allow for the easy access to the particular image.

Navigation Control

Figure 12A:
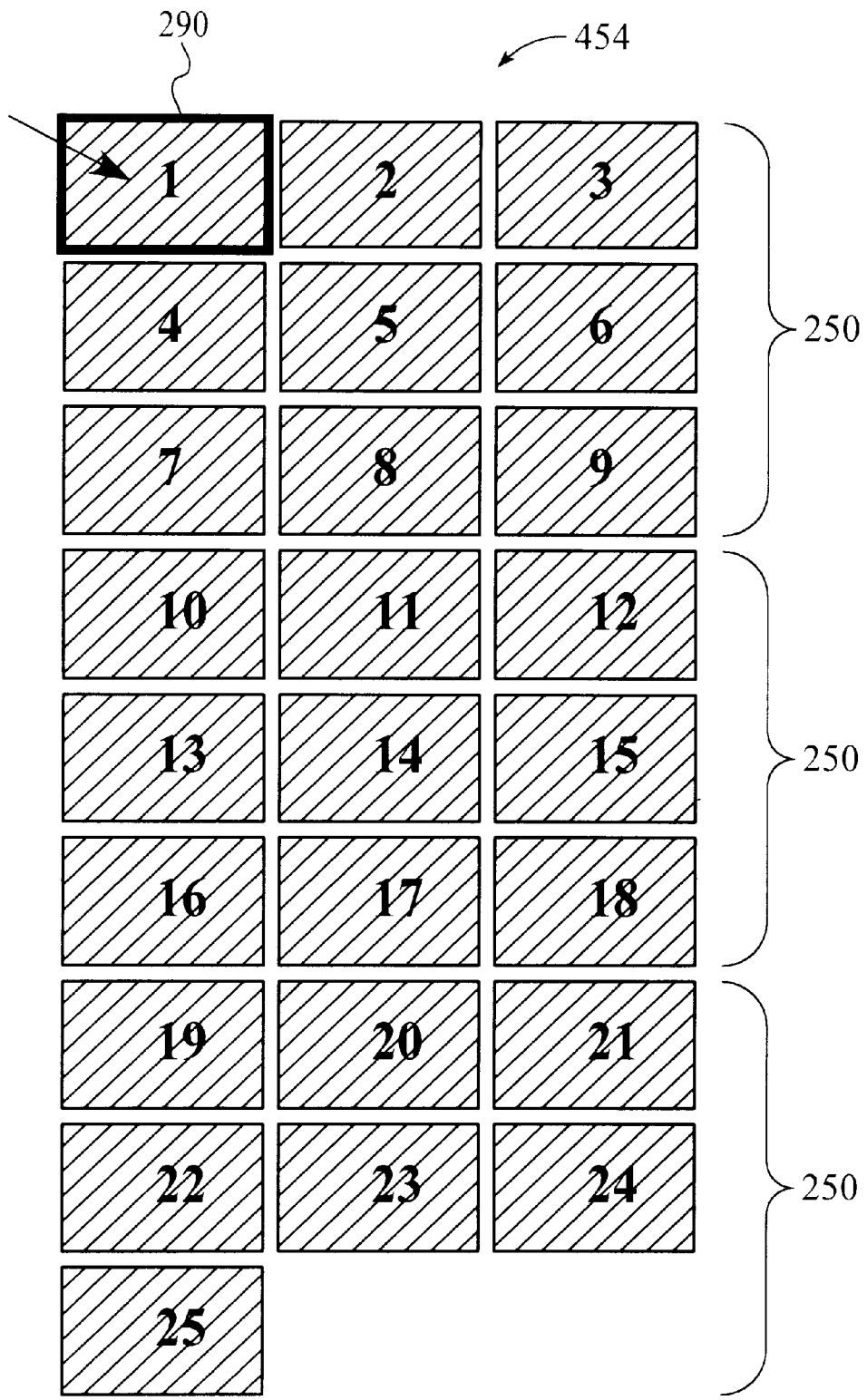
FIG. 12A is a diagram showing plurality of pages of images including a selection rectangle.

An important feature of the present invention is the ability to navigate through a number of pages within a group type via step 406. Referring now to FIG. 12A, what is shown is a plurality of pages 250 of images. In a preferred embodiment, the user can navigate through and select a different "cell" 454 within a particular page by means of the four-way button. The selected cell is highlighted by the selection window 290. As the user depresses the navigation control 271 (FIG. 8) up, down, left, and right, the highlighted box drawn around the cells is moved accordingly.

Figure 13:
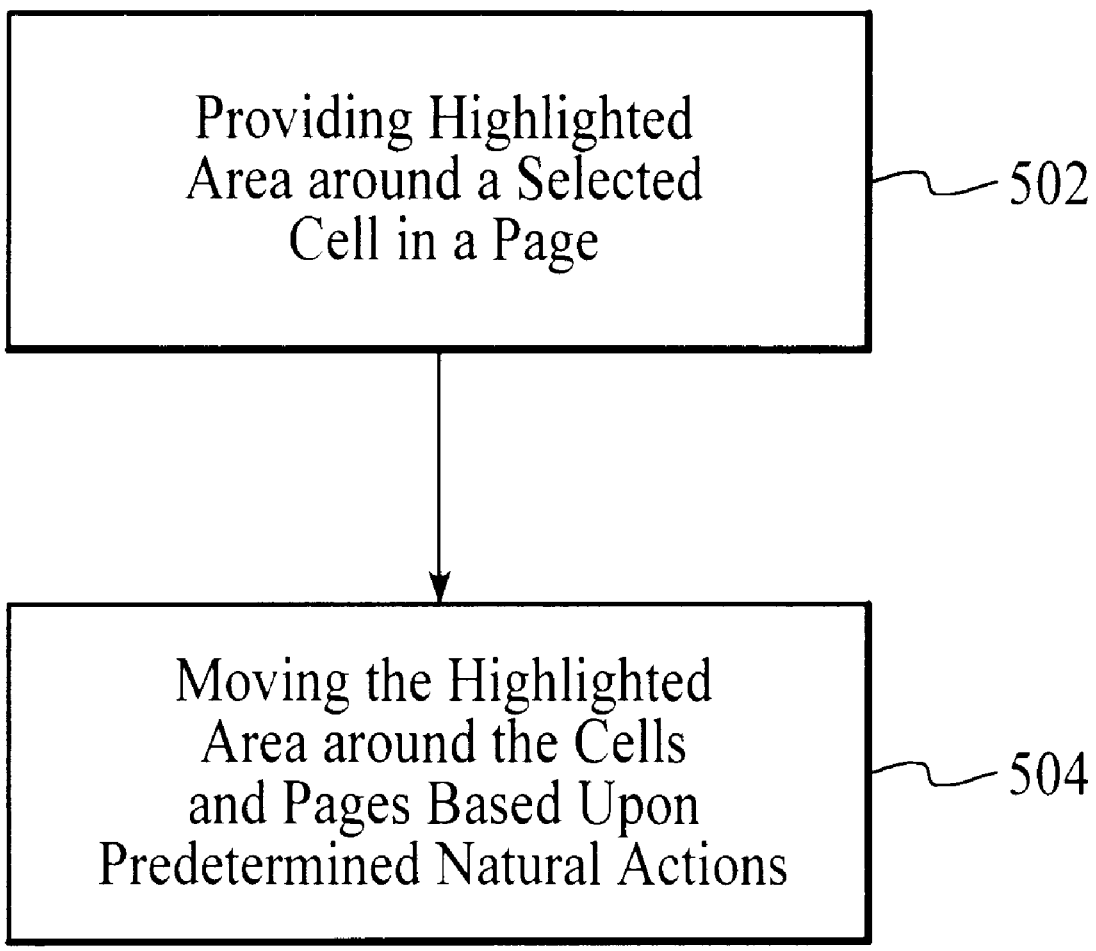
FIG. 13 is a flow chart of the navigation step of FIG. 12 in accordance with the present invention.

Referring now to FIG. 13, what is shown is a flow chart of one embodiment of navigating through the images. In this embodiment, a highlighted area is provided around the selected cell in a page, via step 502. A cell in this embodiment includes a particular image. Then, the selected rectangle is moved around the cells within the page based on a predetermined action, via step 504. The predetermined action in this embodiment, for example, would include moving the highlighted area in a predetermined or natural way. That is the highlighted area can be moved up, down, left or right in a natural way with a reduced number of keystrokes. This feature will be discussed hereunder with reference to particular actions in conjunction with FIGS. 14–19.

Figure 14:
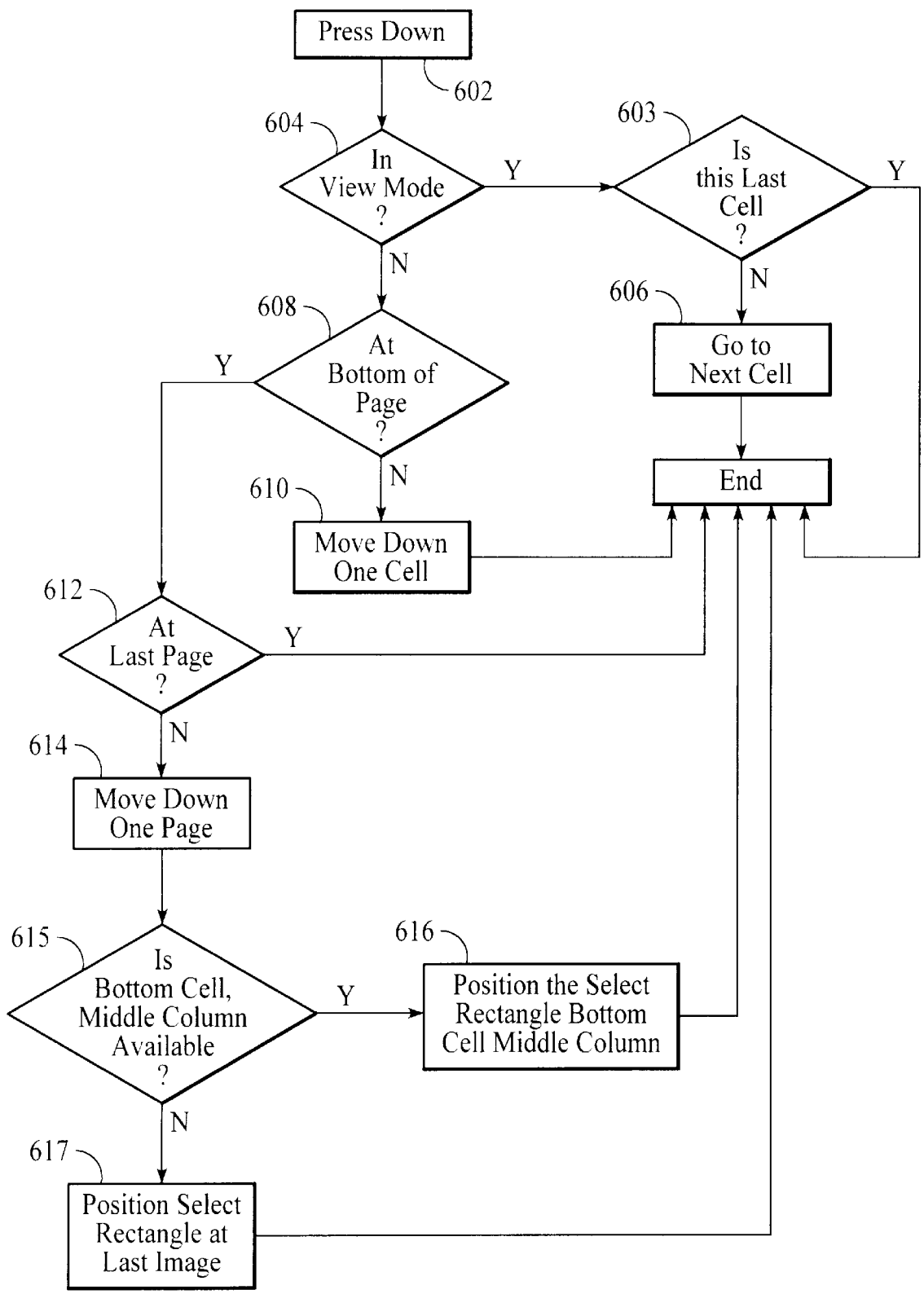
FIG. 14 is a flow chart showing navigation by pressing the down button when the selection rectangle is in a certain position.

FIG. 14 is a flow chart showing the movement by pressing the down button. Accordingly, when the down button is pressed via step 602, first it must be determined if the capture unit is in view mode, via step 604. If it is in the view mode then it must be determined if this is the last cell, via step 603. If it is the last cell then end. If it is not the last cell then go to the next cell, via step 606. Note that view mode is the same as having one image on the screen.

If it is not in the view mode then it must be determined if the selected rectangle is at the bottom of the page, via step 608. If the rectangle is not at the bottom of the page then it will move down one cell, via step 610. If the rectangle is at the bottom of the page, then it must be determined if this is the last page, via step 612. If it is the last page, then end. If it is not the last page then the selected rectangle will move down one page, via step 614 and be positioned at the bottom cell in the middle. In an alternate embodiment the selected rectangle will move to the same column as the original position of the selected rectangle, via step 616. Thereafter a single press of the down button 268 allows for scrolling downwardly a page at a time. Note that this naturally extends the function, that is it still is a down function that is easily and naturally understood by the user. The purpose of step 716 is to allow a single down keystroke to move the highlighted area down a page at a time, once page mode is initiated.

Figure 15:
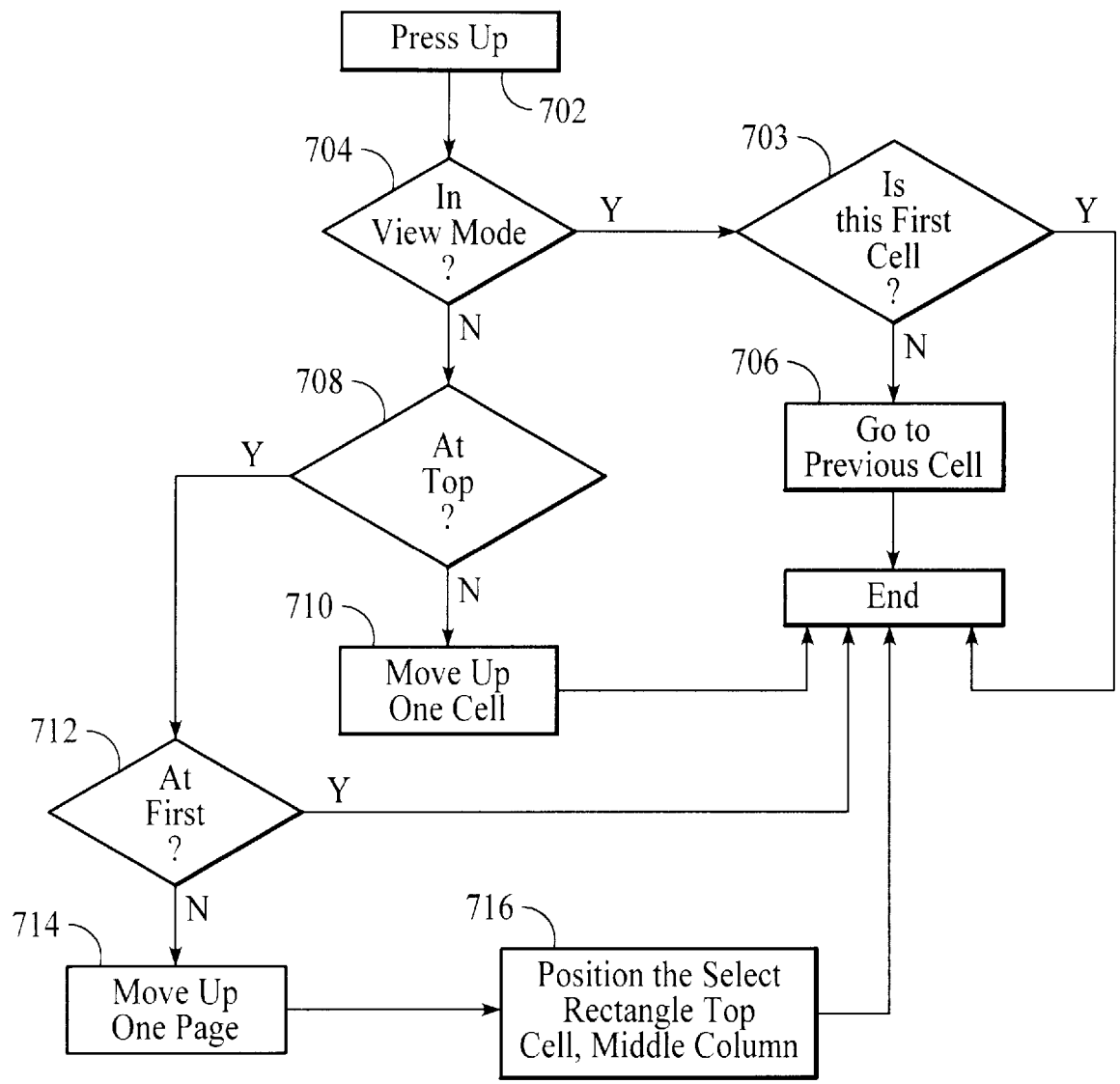
FIG. 15 is a flow chart showing navigation by pressing the up button when the selection rectangle is in a certain position.

FIG. 15 is a flow chart showing the movement by pressing the up button. Accordingly, when the up button is pressed via step 702, first it must be determined if the capture unit is in view mode, via step 704. If it is in the view mode then it must be determined if this is the first cell, via step 705. If it is the first cell then end. If it is not the first cell, then go to previous cell, via step 706.

If it is not in the view mode then it must be determined if the selected rectangle is at the top of the page, via step 708. If the rectangle is not at the top of the page then it will move up one cell, via step 710. If the rectangle is at the top of the page, then it must be determined if this is the first page, via step 712. If it is the first page, then end. If it is not at the first page then the selected rectangle will move up one page, via step 714, and be positioned at the top center cell in the same column, via step 716. Thereafter a single press of the up button 268 allows for scrolling upwardly a page at a time. Note that this naturally extends the function, that is it still is an up function that is easily and naturally understood by the user. The purpose of step 616 is to allow a single up keystroke to move the highlighted area up a page at a time, once page mode is initiated.

Figure 16:
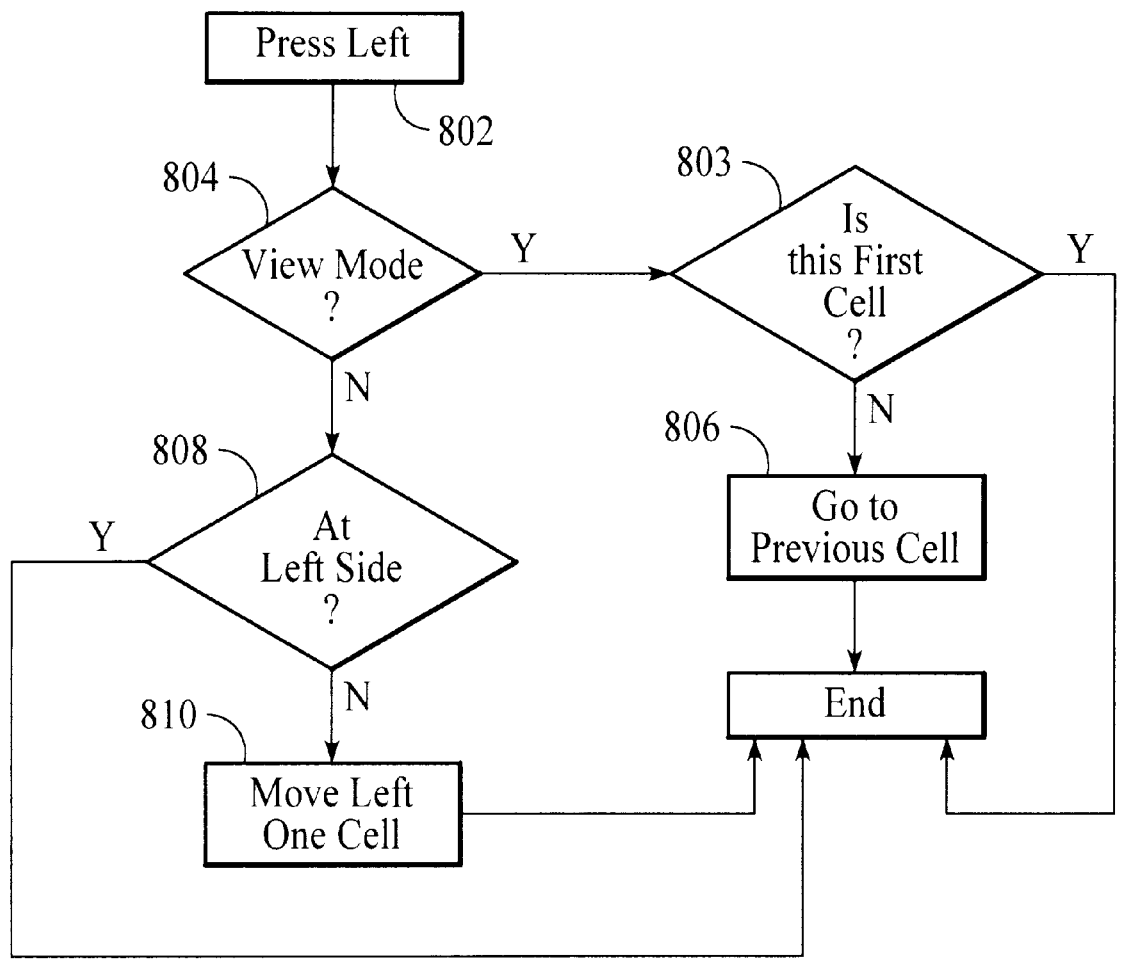
FIG. 16 is a flow chart showing navigation by pressing the left button.

FIG. 16 is a flow chart showing the movement by depressing the left button. Accordingly, when the left button is pressed via step 802, first it must be determined if the capture unit is in the view mode, via step 804. If it is in the view mode then it must be determined if this is the first cell, via step 803. If it is the first cell, then end. If it is not the first cell, then go to previous cell via step 806. If the image capture unit is not in the view mode, then it must be determined if the selected rectangle is at the left side, via step 808. If it is at the left side, then nothing happens. However, if the rectangle is not at the left hand side, then the rectangle will move one cell to the left, via step 810.

Figure 17:
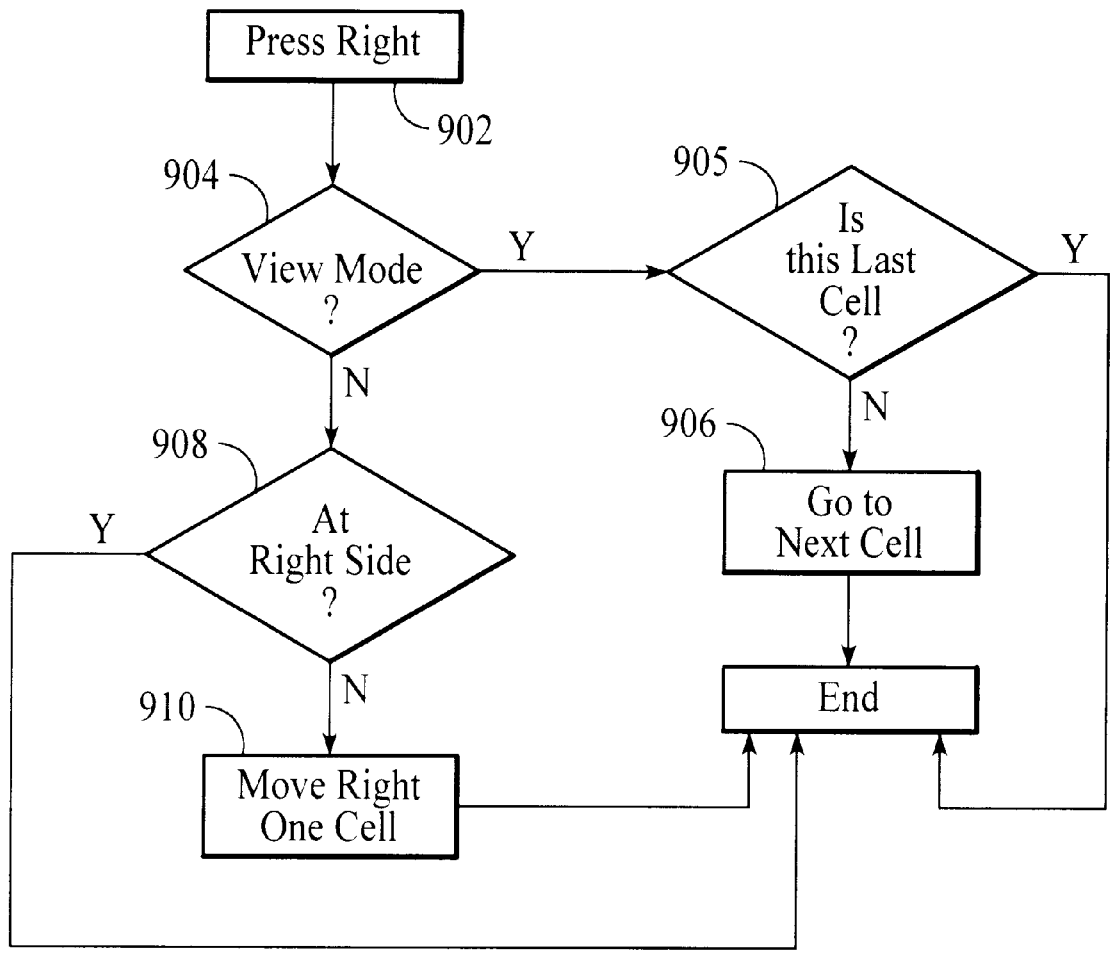
FIG. 17 is a flow chart showing navigation by pressing the right button.

FIG. 17 is a flow chart showing the movement by depressing the right button. Accordingly, when the right button is pressed via step 902, first it must be determined if the capture unit is in the view mode, via step 904. If it is in the view mode then it must be determined if this is the last cell, via step 905. If it is the last cell, then end. If it is not the last cell then go to the next cell.

If the image capture unit is not in the view mode, then it must be determined if the selected rectangle is at the right side, via step 908. If it is at the right side, then nothing happens. However, if the rectangle is not at the right side, then the rectangle will move one cell to the right, via step 910.

Figure 18:
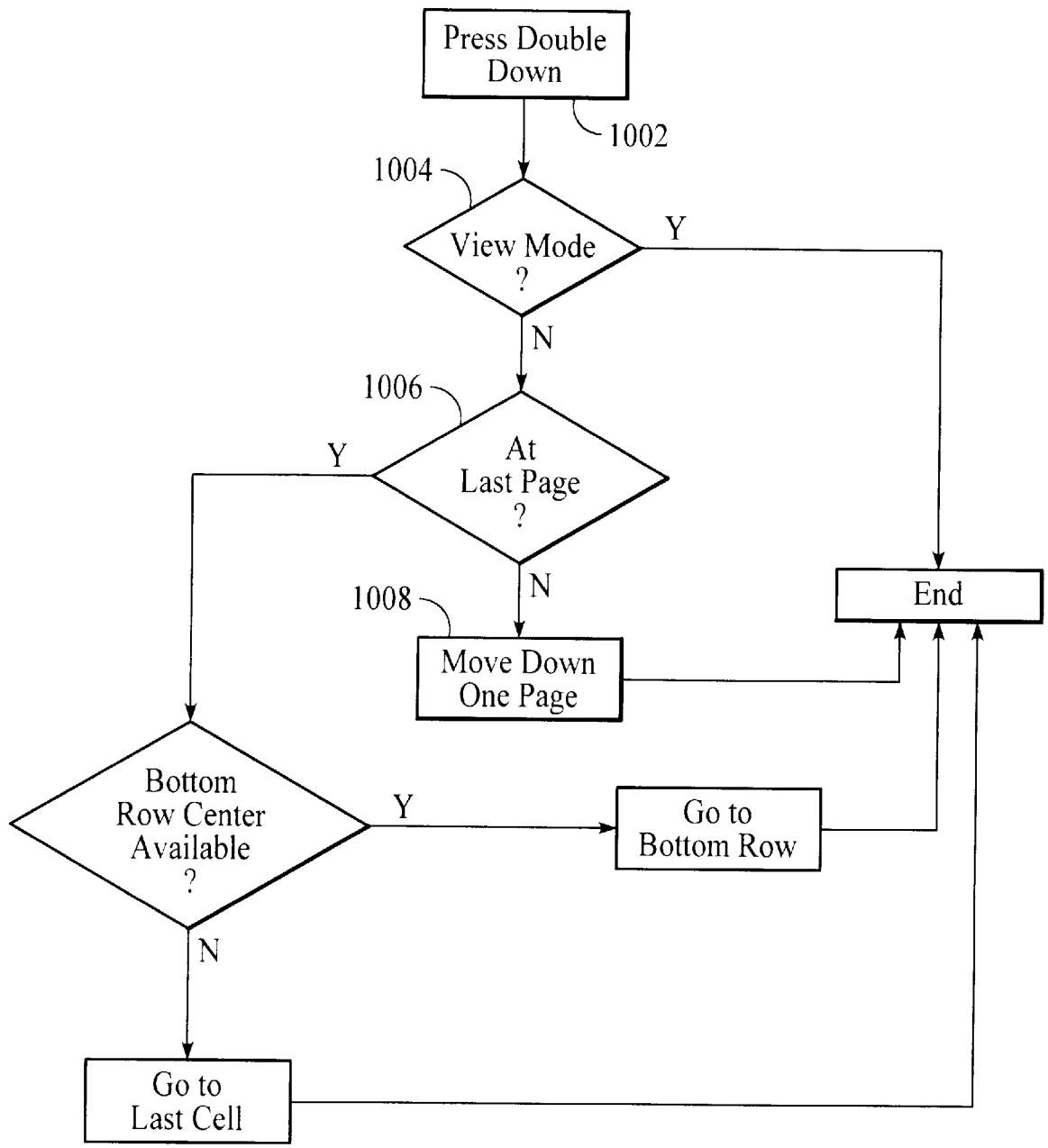
FIG. 18 is a flow chart showing navigation by double pressing the down button.

FIG. 18 is a flow chart showing the movement by double pressing the down button. Accordingly if the down button is double pressed, via step 1002, first it must be determined if the capture unit is in view mode, via step 1004. If it is in view mode, then end. Alternately, this could be handled in the same way as pressing down a single time when in the view mode. If it is not in view mode then it must be determined whether the selection rectangle is at a last page via step 1006. If it is not at a last page then move down one page, via step 1008. If the selection rectangle is at the last page it must be determined if there is an image at the bottom row, center column, via step 1007. If an image is available, then go to bottom row, center column, via step 1007. If an image is not available then go to last image, via step 1011. This "shortcut" mechanism allows the user to enter page mode directly from any position on the page.

Figure 19:
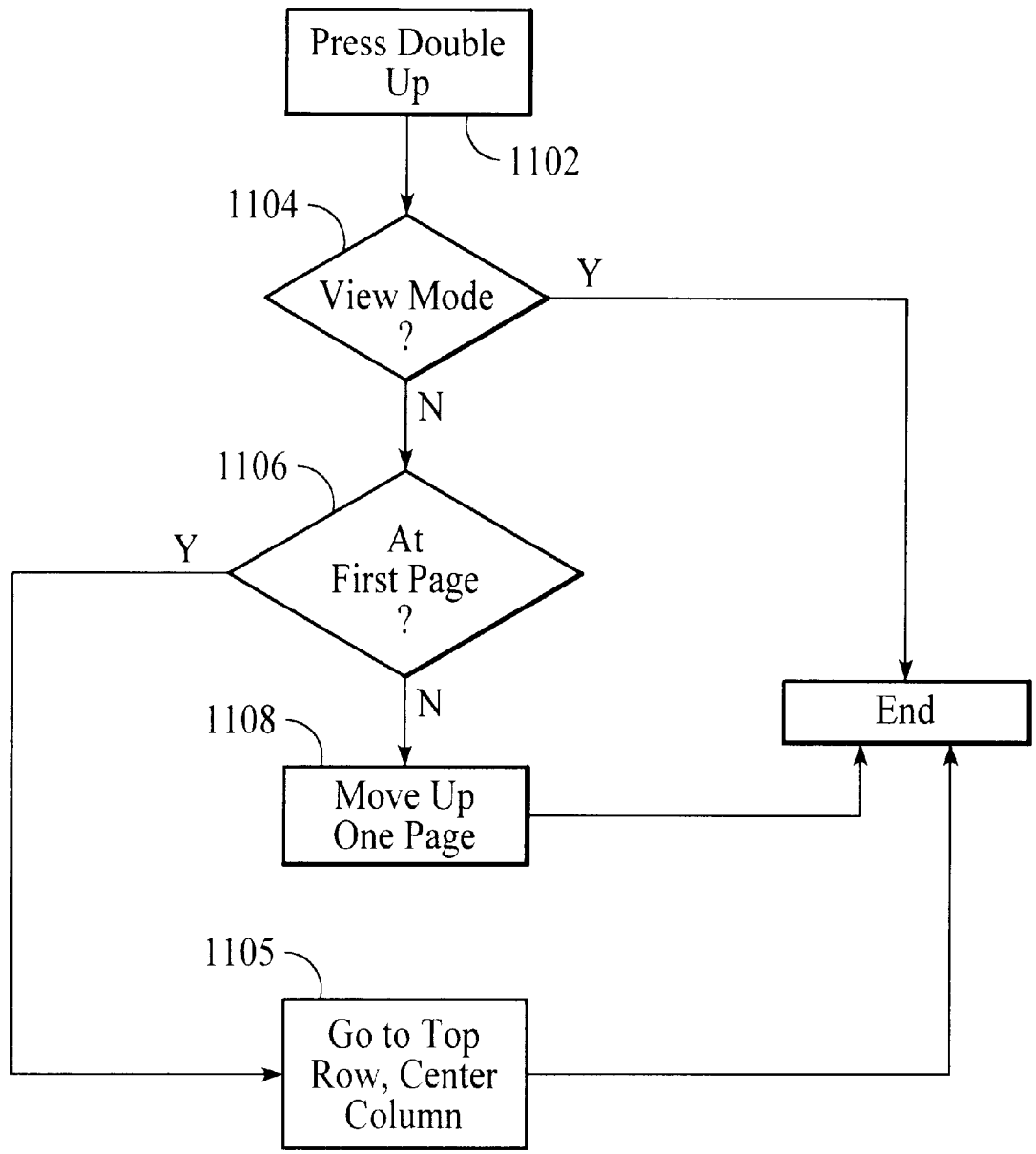
FIG. 19 is a flow chart showing navigation by double pressing the up button.

FIG. 19 is a flow chart showing the movement by double pressing the up button. Accordingly if the up button is double pressed, via step 1102, first it must be determined if the capture unit is in view mode, via step 1104. If it is in view mode, then end. Alternatively, this could be handled in the same way as pressing the up key button a single time when in the view mode. If it is not in view mode then it must be determined whether the selection rectangle is at a first page, via step 1106. If it is at a first page, then go to the top row, center column. If it is not at a first page then move up one page, via step 1108. This is a similar shortcut as described earlier.

In another embodiment, a triple press of the down button 268 moves the selection rectangle 290 to the last page and last image, and a triple press of the up button 266 moves the selection rectangle 290 to the first page and first image. Alternately, a double press of the left or right button could produce the same result.

Figure 1:
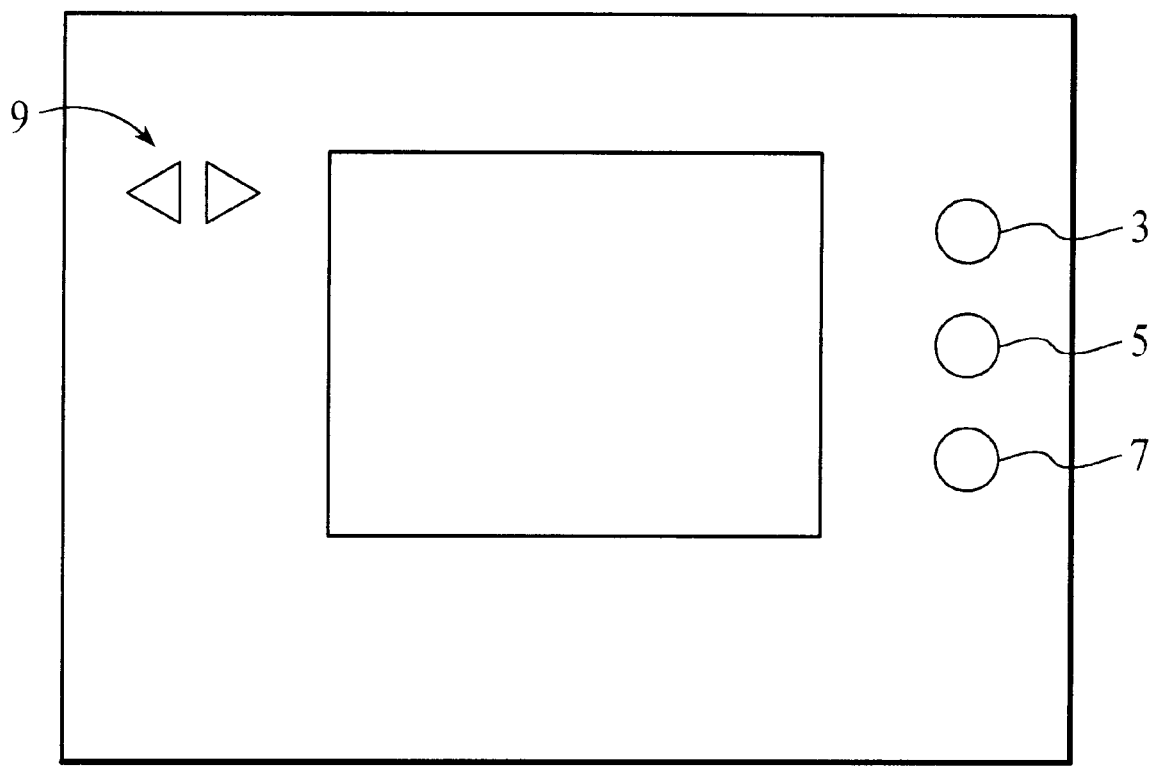
FIG. 1 is a diagram of a conventional digital camera.
Figure 2:
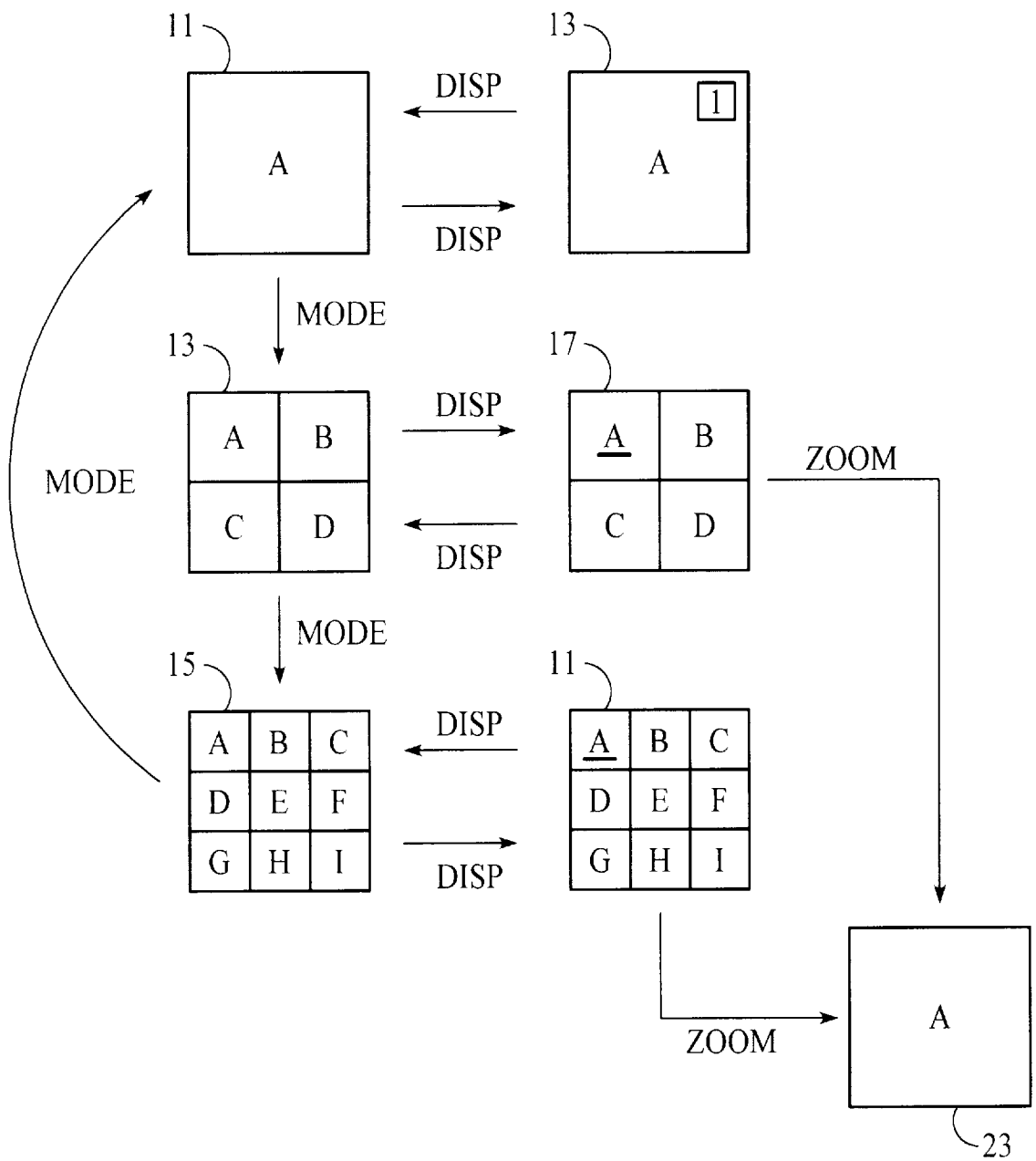
FIG. 2 is a diagram that shows the interaction between the buttons in the digital camera.
Figure 3A:
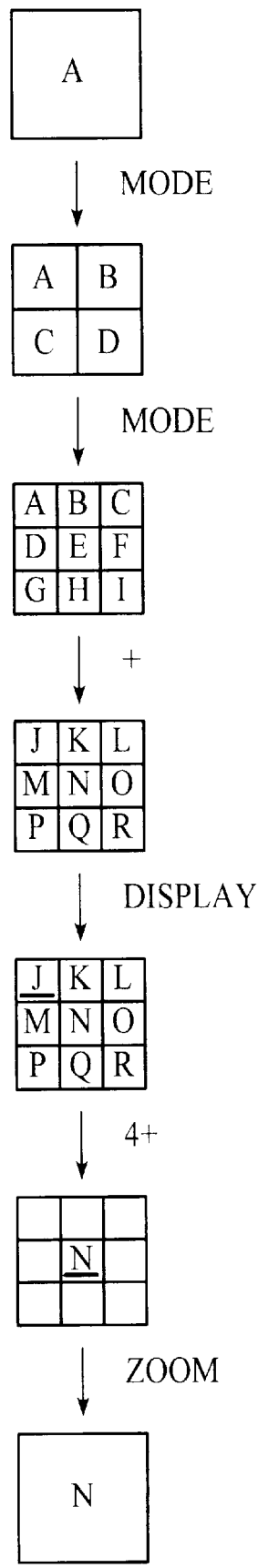
FIG. 3A shows the process of the selection of a fourteenth image using the digital camera of FIG. 1.

The present invention provides for a more natural review and navigation system for an image capture device which facilitates faster review of images. By allowing for a more natural review, a user can more easily understand how to navigate through images, Referring back to the previous example, illustrated in FIG. 3A in which the fourteenth image is selected for review, as was before noted at least nine keystrokes are required to display the selected image.

Figure 20A:
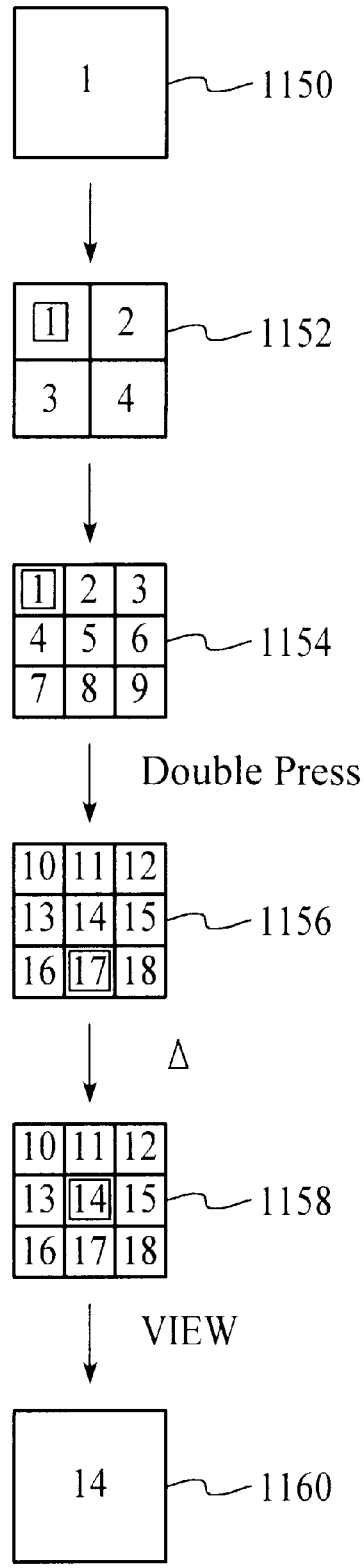
FIG. 20A is a diagram showing the selection of the fourteenth image in accordance with the present invention.

In a system in accordance with the present invention, considerably less keystrokes are required and they follow a more natural pattern. Referring now to FIG. 20A, what is shown is a system for selecting the fourteenth image in accordance with the present invention. First, the mode button is pressed two times so that the group type is nine images per page (blocks 1152 and 1154). Next, the down button is double-clicked so the bottom image of the middle row of the next page is selected (block 1156). Next, the up button is pressed such that the fourteenth image is selected (block 1158). Finally, the view button is pressed to display the fourteenth image (block 1160). Hence, as is seen, only six keystrokes are required to select the fourteenth image.

Figure 3B:
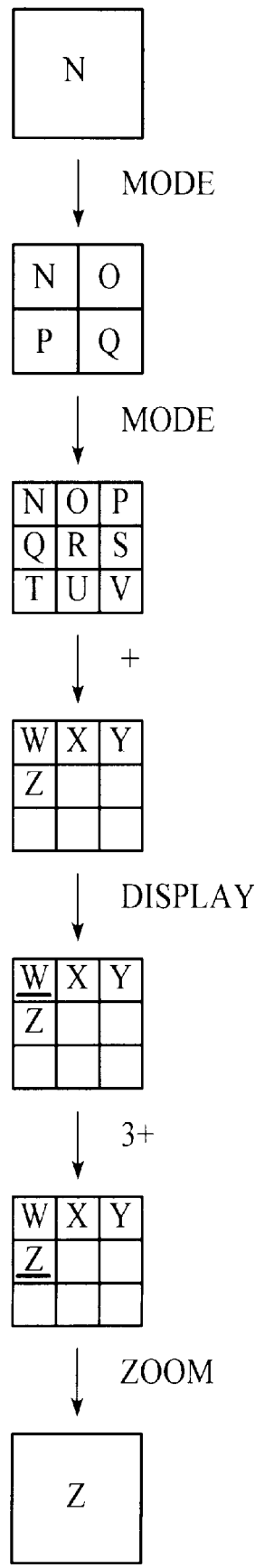
FIG. 3B shows the process of selection of the twenty-sixth image using the digital camera of FIG. 1.
Figure 20B:
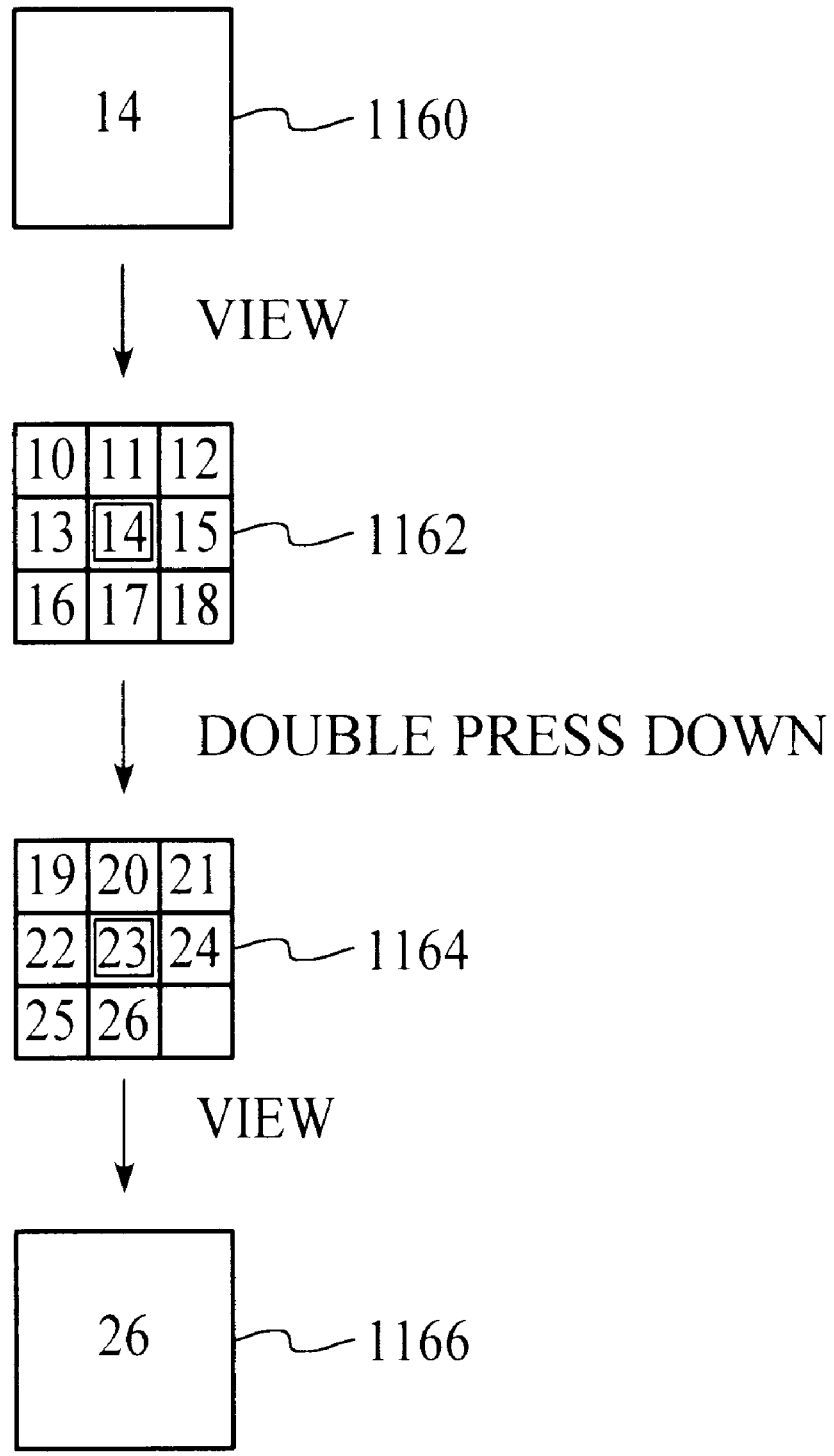
FIG. 20B is a diagram showing the selection of the twenty-sixth image in accordance with the present invention.

Referring now to FIG. 20B, what is shown is a system for proceeding to the twenty-sixth image from the displayed fourteenth image. As has been before mentioned in relationship to FIG. 3B, eight keystrokes were required to select the twenty-sixth image utilizing a conventional image capture display system. A system and method in accordance with the present invention can significantly reduce the number of keystrokes. First the view button is pressed to cause the display to return to the group type of nine images per display (block 1162). Thereafter the down button is double-pressed (block 1164). At this point the twenty-sixth image is selected. Thereafter, the view button is pressed and the selected image is displayed (block 1164). Hence as is seen, a total of only four keystrokes are required to select the twenty-sixth image.

Therefore, as can be seen, a method and system is provided for reviewing and navigating among images displayed on an image capture device in an efficient and straightforward manner. This system is more natural than previously known systems because the movement is straightforward. Each of the keys has only one function and that functionality remains consistent. In so doing, this system facilitates ease in navigating through and reviewing such images produced and is extremely advantageous over known conventional techniques.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

What is claimed is:

1. A method for reviewing and navigating through images in an image capture device, the image capture device including a display and a four-way navigation button having left, right, up and down buttons, comprising the steps of:
   a) displaying images on the image capture device in a predetermined number of group types, each of the group types indicating the number of images to be simultaneously displayed, the number of images to be simultaneously displayed being a page;
   b) allowing a user to select one group type from the predetermined number of group types;
   c) highlighting a selected image on a current page with a highlight area;
   d) allowing the user to scroll directly from the current page to a next page or a previous pare within the group type with a single button press by
      i) displaying the next page in response to the user pressing the down button when the highlighting area is located at a bottom of the current page, wherein the highlighting area is placed at the bottom of the next page, and
      ii) displaying the previous page in response to the user pressing the up button when the highlighting area is located at a top of the current page, wherein the highlighting area is placed at the top of the previous page;
   e) allowing the user to scroll directly from the current page to the next page or the previous page within the group type with two button presses when the highlighting area is located at any position on the current page by
      i) displaying the next page in response to user double pressing the down button, and
      ii) displaying the previous page in response to user double pressing the up button; and
   f) allowing the user to scroll directly from the current page to a first page or a last page within the group type with three button presses by
      i) displaying the last page in response to a user triple pressing the down button; and
      ii) displaying the first page of images in response to a user triple pressing the up button.

2. The method of claim 1 in which each group type includes at least one cell, each cell including an image.

3. The method of claim 2 in which step (c) comprises the steps of:
   c1) providing the highlighted are a around a selected cell within a particular page of images; and
   c2) moving the highlighted area around the group type based upon a predetermined action.

4. The method of claim 3 in which the predetermined action includes pressing one of the up, down, right and left buttons to move the highlighted area one cell away from its previous location.

5. The method of claim 3 in which the predetermined action comprises double pressing the right button to move the highlighting area to the next page of images.

6. The method of claim 3 in which the predetermined action comprises double pressing the left button to move the highlight area to the previous page of images.

7. The method of claim 1 in which the highlighted area comprises a selection rectangle.

8. A system for reviewing and navigating through images in an image capture device, the image capture device including a display and a four-way navigation button having left, right, up and down buttons, comprising the steps of:
   means for displaying images on the image capture device in a predetermined number of group types, each of the group types indicating a number of images to be simultaneously displayed, the number of images to be simultaneously displayed being a page;
   means for selecting one group type from the predetermined number of group types;
   means for highlighting a selected image on a current page using a highlighting area;
   means for allowing the user to scroll directly from the current page to a next page or a previous page within the group type with a single button press by
      i) displaying the next page in response to the user pressing the down button when the highlighting area is located at a bottom of the current page, wherein the highlighting area is placed at the bottom of the next page, and
      ii) displaying the previous page in response to the user pressing the up button when the highlighting area is located at a top of the current page, wherein the highlighting area is placed at the top of the previous page;

means for allowing the user to scroll directly from the current page to the next page or the previous page within the group type with two button presses when the highlighting area is located at any position on the current page by
  i) displaying the next page in response to user double pressing the down button, and
  ii) displaying the previous page in response to user double pressing the up button; and
means for allowing the user to scroll directly from the current page to a first page or a last page within the group type with three button presses by
  i) displaying the last page in response to a user triple pressing the down button; and
  ii) displaying the first page of images in response to a user triple pressing the up button.

9. The system of claim 8 in which each group type includes at least one cell, each cell including an image.

10. The system of claim 9 further including:
means for providing the highlighted area around a selected cell within a particular page of images; and
means for moving the highlighted area around the group type based upon a predetermined action.

11. The system of claim 10 in which the predetermined action includes pressing one of the up, down, right and left buttons to move the highlighted area one cell away from its previous location.

12. The system of claim 10 in which the predetermined action comprises double pressing the right button to move the highlighting area to the next page of images.

13. The system of claim 10 in which the predetermined action comprising double pressing the left button to move the highlighting area to the previous page of images.

14. The system of claim 8 in which the highlighted area comprises a selection rectangle.

* * * * *